United States Patent
Ast et al.

(10) Patent No.: US 8,561,405 B2
(45) Date of Patent: Oct. 22, 2013

(54) SYSTEM AND METHOD FOR RECOVERING WASTE HEAT

(75) Inventors: Gabor Ast, Garching (DE); Michael Adam Bartlett, Munich (DE); Thomas Johannes Frey, Ingolstadt (DE); Matthew Alexander Lehar, Munich (DE)

(73) Assignee: General Electric Company, Niskayuna, NY (US)

( * ) Notice: Subject to any disclaimer, the term of this patent is extended or adjusted under 35 U.S.C. 154(b) by 11 days.

(21) Appl. No.: 11/770,895

(22) Filed: Jun. 29, 2007

(65) Prior Publication Data

US 2009/0000299 A1    Jan. 1, 2009

(51) Int. Cl.
   *F01K 23/10*    (2006.01)
   *F03G 7/00*    (2006.01)
   *F01K 23/06*    (2006.01)
   *F01K 25/00*    (2006.01)

(52) U.S. Cl.
   USPC ............... 60/618; 60/641.1; 60/670; 60/671; 60/641.2; 60/676

(58) Field of Classification Search
   USPC ............. 60/676–684, 641.1, 641.2, 651, 670, 60/671
   See application file for complete search history.

(56) References Cited

U.S. PATENT DOCUMENTS

| | | | | |
|---|---|---|---|---|
| 4,358,930 A * | 11/1982 | Pope et al. | ...... | 60/647 |
| 4,712,380 A * | 12/1987 | Smith | ...... | 60/641.2 |
| 4,760,705 A * | 8/1988 | Yogev et al. | ...... | 60/651 |
| 4,901,531 A * | 2/1990 | Kubo et al. | ...... | 60/618 |
| 4,996,846 A * | 3/1991 | Bronicki | ...... | 60/641.2 |
| 5,000,003 A * | 3/1991 | Wicks | ...... | 60/618 |
| 5,609,029 A * | 3/1997 | Ahnger et al. | ...... | 60/618 |
| 6,230,480 B1 * | 5/2001 | Rollins, III | ...... | 60/39.182 |
| 6,802,689 B2 | 10/2004 | Nogiwa | | |
| 6,883,328 B2 * | 4/2005 | Bronicki | ...... | 60/670 |
| 6,928,820 B2 * | 8/2005 | Inaba et al. | ...... | 60/618 |
| 6,981,377 B2 | 1/2006 | Vaynberg et al. | | |

(Continued)

FOREIGN PATENT DOCUMENTS

| | | |
|---|---|---|
| DE | 3420293 A1 | 2/1985 |
| EP | 1333157 A1 | 6/2003 |

(Continued)

OTHER PUBLICATIONS

Machine Translation of WO 2006/097089 A2, Published on Sep. 21, 2006.*

(Continued)

*Primary Examiner* — Thai Ba Trieu
(74) *Attorney, Agent, or Firm* — Seema S. Katragadda (57) ABSTRACT

A waste heat recovery system includes at least two integrated rankine cycle systems coupled to at least two separate heat sources having different temperatures. The first rankine cycle system is coupled to a first heat source and configured to circulate a first working fluid. The second rankine cycle system is coupled to at least one second heat source and configured to circulate a second working fluid. The at least one second heat source includes a lower temperature heat source than the first heat source. The first and second working fluid are circulatable in heat exchange relationship through a cascading heat exchange unit for condensation of the first working fluid in the first rankine cycle system and evaporation of the second working fluid in the second rankine cycle system.

34 Claims, 9 Drawing Sheets

(56) References Cited

U.S. PATENT DOCUMENTS

| | | | |
|---|---|---|---|
| 7,062,913 B2 * | 6/2006 | Christensen et al. | 60/651 |
| 7,340,897 B2 * | 3/2008 | Zimron et al. | 60/651 |
| 7,428,816 B2 * | 9/2008 | Singh et al. | 60/651 |
| 7,469,540 B1 * | 12/2008 | Knapton et al. | 60/618 |
| 7,520,133 B2 * | 4/2009 | Hoetger et al. | 60/618 |
| 7,942,001 B2 * | 5/2011 | Radcliff et al. | 60/651 |
| 2003/0218385 A1 * | 11/2003 | Bronicki | 307/43 |
| 2005/0183421 A1 | 8/2005 | Vaynberg et al. | |
| 2006/0196187 A1 | 9/2006 | Zimron et al. | |
| 2007/0095066 A1 * | 5/2007 | Kaplan | 60/670 |

FOREIGN PATENT DOCUMENTS

| | | |
|---|---|---|
| GB | 2427002 A | 12/2006 |
| WO | 8503328 A1 | 8/1985 |
| WO | 2006097089 A2 | 9/2006 |
| WO | 2006/104490 A1 | 10/2006 |
| WO | 2008125827 | 10/2008 |
| WO | 2009045196 | 4/2009 |

OTHER PUBLICATIONS

E. Prabhu; "Solar Trough Organic Rankine Electricity System (Stores) Stage 1: Power Plant Optimization and Economics-Nov. 2000—May 2005"; Subcontract Report NREL/SR-550-39433 Mar. 2006; National Renewable Energy Laboratory; 67 Pages.

PCT/US2008/067090 Search Report and Written Opinion, Oct. 21, 2010.

DE3420293 Abstract Feb. 21, 1885.

* cited by examiner

SYSTEM AND METHOD FOR RECOVERING WASTE HEAT

BACKGROUND

The embodiments disclosed herein relate generally to the field of power generation and, more particularly, to a system and method for recovering waste heat from a plurality of heat sources having different temperatures for generation of electricity.

Enormous amounts of waste heat are generated by a wide variety of industrial and commercial processes and operations. Example sources of waste heat include heat from space heating assemblies, steam boilers, engines, and cooling systems. When waste heat is low grade, such as waste heat having a temperature of heat below 840 degrees Fahrenheit, for example, conventional heat recovery systems do not operate with sufficient efficiency to make recovery of energy cost-effective. The net result is that vast quantities of waste heat are simply dumped into the atmosphere, ground, or water.

Some power generation systems provide better reliability and off-grid operation with alternate fuels such as biogas or landfill gas, with examples being gas turbines and combustion engines such as microturbines and reciprocating engines. Combustion engines may be used to generate electricity using fuels such as gasoline, natural gas, biogas, plant oil, and diesel fuel. However, atmospheric emissions such as nitrogen oxides and particulates may be emitted.

One method to generate electricity from the waste heat of a combustion engine without increasing the output of emissions is to apply a bottoming rankine cycle. A fundamental rankine cycle typically includes a turbo generator, an evaporator/boiler, a condenser, and a liquid pump. However, water based steam rankine cycles are very unattractive in the aforementioned low temperature waste heat region due to high cost and low efficiency. The performance of an organic Rankine cycle (ORC) is limited by constraints of the working fluid circulated within the ORC. Any pure chemical used as a working fluid may be optimal for a specific range of cycle temperatures and pressures. It is therefore difficult to maximize the power output of a single fluid ORC for a system with waste heat sources of different temperature levels.

In another method to generate electricity from waste heat, single cycle system or two-cycle systems are used in heat recovery applications with waste heat sources of different temperature levels. Single-cycle configurations collect heat from the different waste heat locations in a serial arrangement of heat exchangers with an intermediate heating fluid. This "all-in-one" configuration lowers the maximum resulting fluid vapor temperature because the available heat from the various temperature level heat sources is mixed. An undesirable result of this configuration is a lowered Carnot efficiency. In such two-cycle configurations, the hot heat source heats a high-boiling point liquid in a top loop, and the cold heat source heats a low-boiling point liquid in a separate bottom loop. The two-cycle system generally achieves a better performance than a single cycle. Since components in the two-cycle system are more complex and require more components, the overall cost of the two-cycle system is significantly higher.

In another conventional system provided to generate electricity from waste heat, a cascaded organic rankine cycle system for utilization of waste heat includes a pair of organic rankine cycle systems. The cycles are combined, and the respective organic working fluids are chosen such that the organic working fluid of the first organic rankine cycle is condensed at a condensation temperature that is above the boiling point of the organic working fluid of the second organic cycle. A single common heat exchanger is used for both the condenser of the first organic rankine cycle system and the evaporator of the second organic rankine cycle. A cascaded organic rankine cycle system converts surplus heat into electricity within certain temperature ranges but does not recover waste heat over a wide temperature range.

It would be desirable to have a system that effectively recovers waste heat over a wide temperature range from multiple low-grade heat sources.

BRIEF DESCRIPTION

In accordance with one exemplary embodiment disclosed herein, a waste heat recovery system including at least two integrated rankine cycle systems is provided. The system includes a heat generation system comprising at least two separate heat sources having different temperatures. The recovery system includes a first rankine cycle system having a first expander. The first rankine cycle system is coupled to a first heat source among the at least two separate heat sources and configured to circulate a first working fluid. The first rankine system is configured to remove heat from the first heat source. A second rankine cycle system includes a second expander and a condenser. The second rankine cycle system is coupled to at least one second heat source among the at least two separate heat sources and configured to circulate a second working fluid. The at least one second heat source includes a lower temperature heat source than the first heat source. The second rankine cycle system is configured to remove heat from the at least one second heat source. The first and second working fluids are circulatable in heat exchange relationship through a cascaded heat exchange unit for condensation of the first working fluid in the first rankine cycle system and evaporation of the second working fluid in the second rankine cycle system.

In accordance with one exemplary embodiment disclosed herein, a waste heat recovery system including at least two integrated organic rankine cycle systems is provided. The system includes a combustion engine having an engine exhaust unit; and at least another heat source selected from a group comprising an oil heat exchanger, engine jacket, water jacket heat exchanger, lower temperature intercooler, higher temperature intercooler, or combinations thereof. The recovery system includes a first organic rankine cycle system having a first expander. The first organic rankine cycle system is coupled to the engine exhaust unit and configured to circulate a first organic working fluid. A second organic rankine cycle system includes a second expander and a condenser. The second organic rankine cycle system is coupled to at least one other heat source selected from the group comprising the oil heat exchanger, engine jacket, water jacket heat exchanger, lower temperature intercooler, higher temperature intercooler, or combinations thereof, and configured to circulate a second organic working fluid. The one heat source includes a lower temperature heat source than at least one other heat source. The second organic rankine cycle system is configured to remove heat from the at least one other heat source. The first and second organic working fluids are circulatable in heat exchange relationship through a cascaded heat exchange unit for condensation of the first organic working fluid in the first organic rankine cycle system and evaporation of the second organic working fluid in the second organic rankine cycle system.

In accordance with one exemplary embodiment disclosed herein, a waste heat recovery system including at least two integrated rankine cycle systems is provided. The system includes a heat generation system comprising at least two separate heat sources having different temperatures. The recovery system includes a first rankine cycle system having a first expander. The first rankine cycle system is coupled to a first heat source among the at least two separate heat sources and configured to circulate a first working fluid. The first rankine system is configured to remove heat from the first heat source. A second rankine cycle system includes a second expander and a condenser. The second rankine cycle system is coupled to at least one second heat source among the at least two separate heat sources and configured to circulate a second working fluid. The at least one second heat source includes a lower temperature heat source than the first heat source. The second rankine cycle system is configured to remove heat from the at least one second heat source. The first and second working fluids are circulatable in heat exchange relationship through a cascaded heat exchange unit for condensation of the first working fluid in the first rankine cycle system and evaporation of the second working fluid in the second rankine cycle system. The second rankine cycle is configured to partially evaporate the second working fluid before entering the cascaded heat exchange unit.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention provide a waste heat recovery system having at least two integrated rankine cycle systems coupled to at least two separate heat sources respectively having different temperatures. The first rankine cycle system is coupled to a first heat source and configured to circulate a first working fluid. The second rankine cycle system is coupled to at least one second heat source and configured to circulate a second working fluid. The second heat source includes a lower temperature heat source than the first heat source. The waste heat recovery system also includes a cascaded heat exchange unit. The first and second working fluids are circulated in heat exchange relationship for condensation of the first working fluid in the first rankine cycle system and evaporation of the second working fluid in the second rankine cycle system. In certain other exemplary embodiments, a method for operating a waste heat recovery system is disclosed. In accordance with the exemplary embodiments of the present invention, the waste heat recovery system is integrated with multiple low-grade heat sources to allow a higher efficient recovery of waste heat for generation of electricity. Although the waste heat recovery system in the exemplary embodiments of FIGS. 1-9 is described with reference to combustion engines, the system is also applicable to other heat generation systems such as gas turbines, geothermal, solar thermal, industrial and residential heat sources, or the like.

Figure 1:
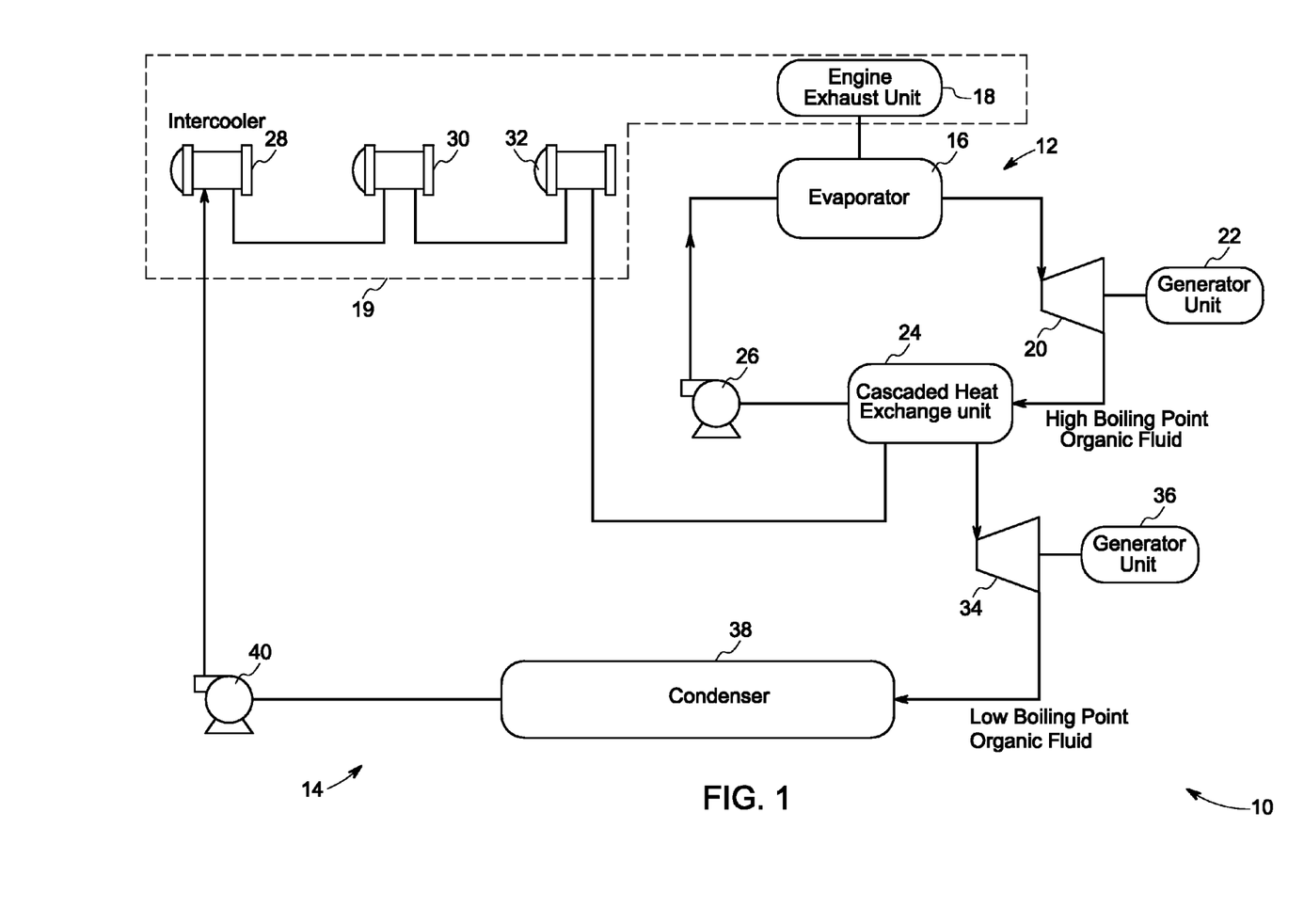
FIG. 1 is a diagrammatical representation of a waste heat recovery system having two integrated organic rankine cycle systems in accordance with an exemplary embodiment disclosed herein.

Referring to FIG. 1, a waste heat recovery system 10 is illustrated in accordance with an exemplary embodiment of the present invention. The illustrated waste heat recovery system 10 includes a first organic rankine cycle system 12 (top cycle) and a second organic rankine cycle system 14 (bottom cycle). A first organic working fluid is circulated through the first organic rankine cycle system 12. The first organic working fluid may include cyclohexane, cyclopentane, thiophene, ketones, aromatics, or combinations thereof. The first organic rankine cycle system 12 includes an evaporator 16 coupled to a first heat source 18, for example an exhaust unit of a heat generation system 19 (for example, an engine). In one example, the temperature of the exhaust unit of the engine may be in the temperature range of 400 to 500 degrees Celsius. The evaporator 16 receives heat from the exhaust gas generated from the first heat source 18 and generates a first organic working fluid vapor. In one example, the first organic working fluid vapor may be at a pressure of 19 bars and temperature of 225 degrees Celsius. The first organic working fluid vapor is passed through a first expander 20 (which in one example comprises a radial type expander) to drive a first generator unit 22. In certain other exemplary embodiments, the first expander may be axial type expander, impulse type expander, or high temperature screw type expander. After passing through the first expander 20, the first organic working fluid vapor at a relatively lower pressure and lower temperature is passed through the cascaded heat exchange unit 24. The first organic working fluid vapor is condensed into a liquid, which is then pumped via a pump 26 to the evaporator 16. In one example, the condensed organic fluid may be supplied to the evaporator 16 at a pressure of 1.4 bars and 95 degrees Celsius. The cycle may then be repeated.

The cascaded heat exchange unit 24 is used both as a condenser for the first organic rankine cycle system 12 and as evaporator for the second organic rankine cycle system 14. A second organic working fluid is circulated through the second organic rankine cycle system 14. The second organic working fluid may include propane, butane, pentafluoro-propane, pentafluoro-butane, pentafluoro-polyether, oil, or combinations thereof. It should be noted herein that list of first and second organic working fluids are not inclusive and other organic working fluids applicable to organic rankine cycles are also envisaged. In certain other exemplary embodiments, the first or second organic working fluid includes a binary fluid. The binary fluid may include cyclohexane-propane, cyclohexane-butane, cyclopentane-butane, or cyclopentane-pentafluoropropane, for example. Cascaded heat exchange unit 24 may be coupled to any one or more of a plurality of second heat sources such as an intercooler 28, an oil heat exchanger 30, and a cooling water jacket heat exchanger 32. Such second heat sources are also typically coupled to the engine. In a more specific embodiment, cascaded heat exchange unit 24 is coupled to at least two second heat sources with the at least two second heat sources being coupled either in series or parallel. It should be noted herein that the second heat source includes a lower temperature heat source than the first heat source. In one example, the temperature of the second heat source may be in the range of 80 to 100 degrees Celsius. It should be noted that in other exemplary embodiments, first and second heat sources may include other multiple low-grade heat sources such as gas turbines with intercoolers. The cascaded heat exchange unit 24 receives heat from the first organic working fluid and generates a second organic working fluid vapor. In one example, the second organic working fluid vapor may be at a pressure of 9 bars and temperature of 87 degrees Celsius. The second organic working fluid vapor is passed through a second expander 34 (which in one example comprises a screw type compressor) to drive a second generator unit 36. In certain other exemplary embodiments, the second expander 34 may be a radial type expander, an axial type expander, or an impulse type expander. In certain other exemplary embodiments, the first expander 20 and the second expander 34 are coupled to a single generator unit.

In an exemplary embodiment, neither of the first and second organic working fluids are expanded below the atmospheric pressure, and the boiling point temperature of the first organic working fluid is below the average temperature of the second heat source. In certain examples, the boiling point of the second organic working fluid is below 50 degrees Celsius. After passing through the second expander 34, the second organic working fluid vapor at lower pressure and lower temperature is passed through a condenser 38. The second organic working fluid vapor is condensed into a liquid, which is then pumped via a pump 40 to the second heat sources. In the illustrated embodiment, the second organic working fluid is pumped sequentially via the intercooler 28, the oil heat exchanger 30, and the cooling water jacket heat exchanger 32. In one example, the liquid may be supplied to the second heat sources at a pressure of 10 bars and temperature of 30 degrees Celsius. The cycle may then be repeated.

The cascaded organic rankine cycle system facilitates heat recovery over a temperature range that is too large for a single organic rankine cycle system to accommodate efficiently. In one embodiment, the intercooler 28, the oil heat exchanger 30, and the cooling water jacket heat exchanger 32 are coupled along a single cooling loop in which the second organic working fluid is heated and partially evaporated. The illustrated layout of the second heat sources facilitates effective heat removal from the plurality of lower temperature engine heat sources. This increases the effectiveness of the cooling systems and provides effective conversion of waste heat into electricity. It should be noted herein that the temperature and pressure values discussed above and in subsequent paragraphs are exemplary values and should not be construed as limiting values. The values may vary depending on the applications.

In another exemplary embodiment of the present invention, the heat generation system may include a gas turbine system. Steam may be circulated through the top cycle and the second organic working fluid may be circulated through the bottom cycle. Steam is condensed and passed in heat exchange relationship with the second organic working fluid through the cascaded heat exchange unit 24.

Figure 2:
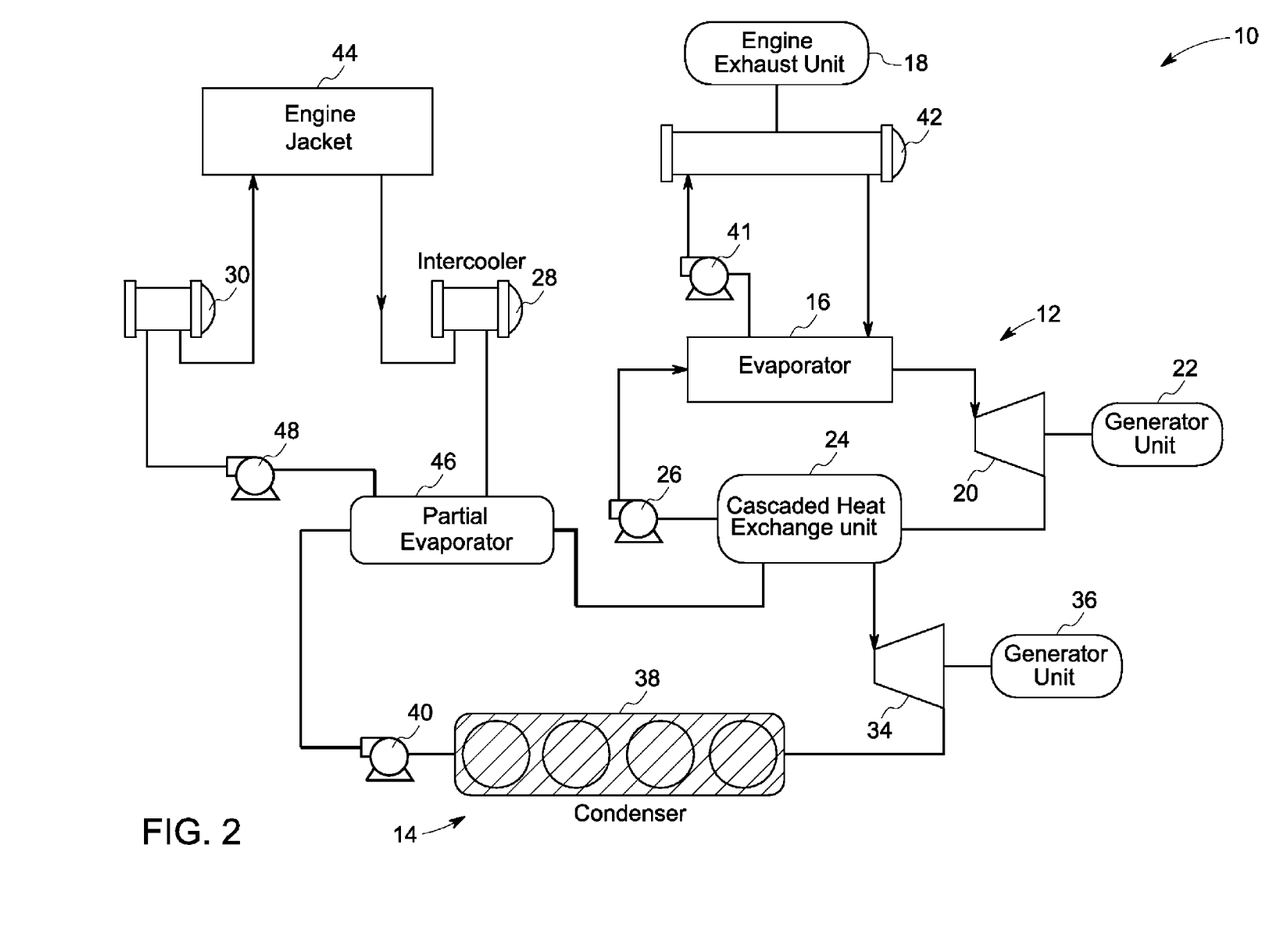
FIG. 2 is a diagrammatical representation of a waste heat recovery system having two integrated organic rankine cycle systems in accordance with another exemplary embodiment disclosed herein.

Referring to FIG. 2, a waste heat recovery system 10 is illustrated in accordance with another exemplary embodiment of the present invention. As discussed above, the illustrated waste heat recovery system 10 includes the first organic rankine cycle system 12 and the second organic rankine cycle system 14. In the illustrated embodiment, the first organic rankine cycle system 12 includes the evaporator 16 coupled to the first heat source 18, i.e. the exhaust unit of the engine, via a thermal oil heat exchanger 42. In the illustrated embodiment, the thermal oil heat exchanger 42 is a shell and tube type heat exchanger. The thermal oil heat exchanger 42 is used to heat thermal oil to a relatively higher temperature using exhaust gas of the engine. In one example, the thermal oil is heated from 160 to 280 degrees Celsius. The evaporator 16 receives heat from the thermal oil and generates a first organic working fluid vapor. The thermal oil is then pumped back from the evaporator 16 to the thermal oil heat exchanger 42 using a pump 41.

In the illustrated embodiment, the cascaded heat exchange unit 24 is coupled to a plurality of second heat sources such as the intercooler 28, the oil heat exchanger 30, and an engine jacket 44 via a partial evaporator 46. The partial evaporator 46 receives heat from a cooling water loop that collects heat from the oil heat exchanger 30, the engine jacket 44, and the intercooler 28 and generates a partially evaporated second organic working fluid two-phase stream. The second organic working fluid stream is passed through the cascaded heat exchange unit 24 for complete evaporation or even superheating of the second organic working fluid. The vaporized second organic working fluid is passed through the second expander 34 to drive the second generator unit 36. After passing through the second expander 34, the second organic working fluid vapor at lower pressure and lower temperature is passed through the condenser 38. The second organic working fluid vapor is condensed into a liquid, which is then pumped via a pump 40 to the partial evaporator 46. The partial evaporator 46 is configured to partially evaporate the liquid being supplied to the cascaded heat exchange unit 24. One advantage of partial evaporation is improved efficiency from a better fit of the cascaded organic rankine cycle to balance of the heat sources (for an engine, for example, the fraction of available heat in the exhaust and lower temperature heat sources). In one exemplary embodiment, the liquid is heated from 32 to 85 degrees Celsius and evaporated to a vapor quality of 0.3. The fluid in the cooling water loop is pumped via a pump 48 to the oil heat exchanger 30, before being supplied to the engine jacket, 44, and the intercooler 28 before it enters the partial evaporator 46. The cycle may then be repeated.

Figure 3:
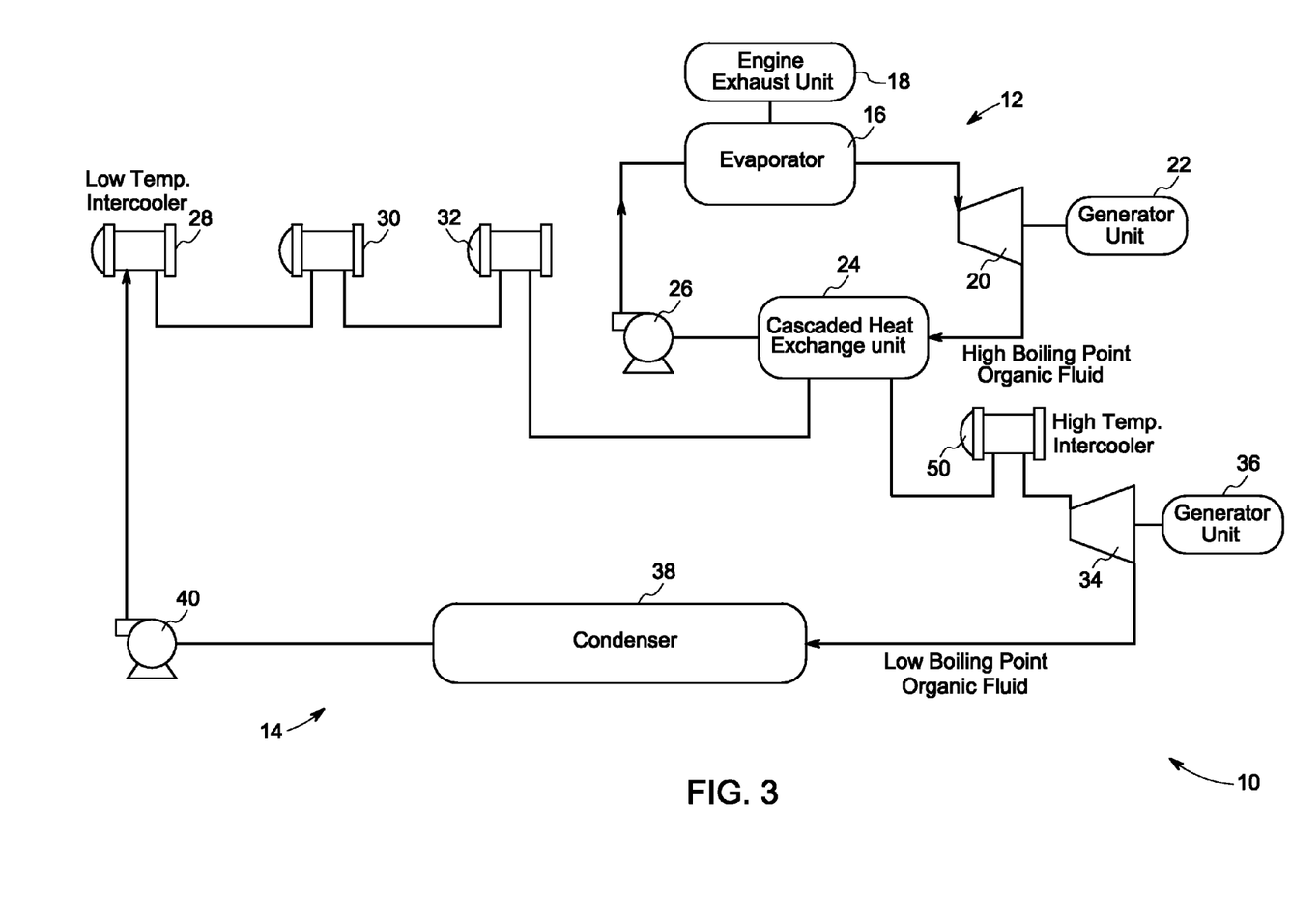
FIG. 3 is a diagrammatical representation of a waste heat recovery system having two integrated organic rankine cycle systems in accordance with yet another exemplary embodiment disclosed herein.

Referring to FIG. 3, a waste heat recovery system 10 is illustrated in accordance with another exemplary embodiment of the present invention. In the illustrated embodiment, the cascaded heat exchange unit 24 is coupled to a plurality of second heat sources such as the intercooler 28, the oil heat exchanger 30, and the water jacket heat exchanger 32. The second heat sources are used to preheat or partially vaporize the second organic working fluid entering the cascading heat exchange unit. In the illustrated embodiment, the intercooler 28 is a lower temperature intercooler. The cascaded heat exchange unit 24 receives heat from the first organic working fluid and generates a second organic working fluid vapor. The second organic working fluid vapor is passed through a higher temperature intercooler 50 to the second expander 34 to drive the second generator unit 36. In the illustrated embodiment, the lower temperature intercooler 28 performs preheating of the second organic working fluid flowing to the cascaded heat exchange unit 24. The higher temperature intercooler 50 provided downstream of the cascaded heat exchange unit 24 is used to heat the second organic working fluid exiting from the cascaded heat exchange unit 24 to a relatively higher temperature, to complete evaporation or to superheat the second organic working fluid. The provision of the lower temperature intercooler 28 and the higher temperature intercooler 50 respectively to both upstream and downstream of the cascaded heat exchange unit 24 facilitates effective heating of the second organic working fluid and thereby enable effective heat recovery.

After passing the second organic working fluid through the second expander 34, the second organic working fluid vapor at lower pressure and lower temperature is passed through the condenser 38. The second organic working fluid vapor is condensed into a liquid, which is then pumped via the pump 40 to the lower temperature intercooler 28. In the illustrated embodiment, the second organic working fluid is sequentially passed through the lower temperature intercooler 28, the oil heat exchanger 30, and the water jacket heat exchanger 32 before entering the cascading heat exchange unit 24.

Figure 4:
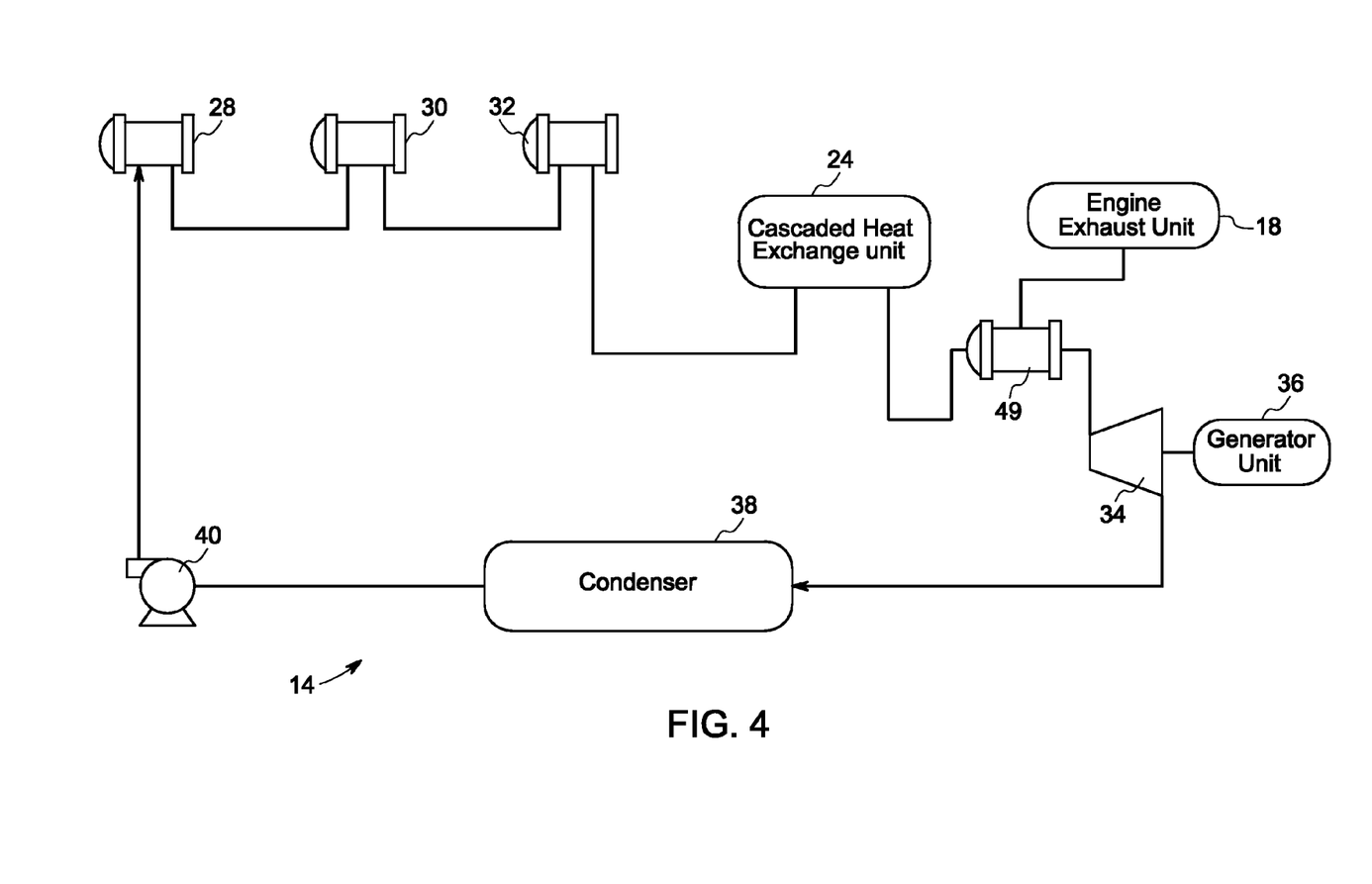
FIG. 4 is a diagrammatical representation of a bottom cycle of a waste heat recovery system in accordance with an exemplary embodiment disclosed herein.

Referring to FIG. 4, the second organic rankine cycle system 14 (bottom cycle) of the waste heat recovery system 10 is illustrated in accordance with an exemplary embodiment of the present invention. In the illustrated embodiment, the cascaded heat exchange unit 24 is coupled to a plurality of second heat sources such as the intercooler 28, the oil heat exchanger 30, and the water jacket heat exchanger 32. The second heat sources are used to preheat or partially vaporize the second organic working fluid entering the cascading heat exchange unit 24. The cascaded heat exchange unit 24 receives heat from the first organic working fluid and generates a second organic working fluid vapor. In the illustrated embodiment, the second organic working fluid vapor is passed in heat exchange relationship with the engine exhaust gas (generated from the engine exhaust unit 18) via a heat exchanger 49. The heat exchanger 49 provided downstream of the cascaded heat exchange unit 24 is used to heat the second organic working fluid exiting from the cascaded heat exchange unit 24 to a relatively higher temperature, to complete evaporation or to superheat the second organic working fluid. The provision of the heat exchanger 49 to the downstream side of the cascaded heat exchange unit 24 facilitates effective heating of the second organic working fluid and thereby enable effective heat recovery from the first heat source i.e. engine exhaust unit. In certain other exemplary embodiments, the heat exchanger 49 may be provided to the upstream side of the cascaded heat exchange unit 24. The second organic working fluid vapor exiting the heat exchanger 49 is passed through the second expander 34 to drive the second generator unit 36. The cycle may then be repeated.

Figure 5:
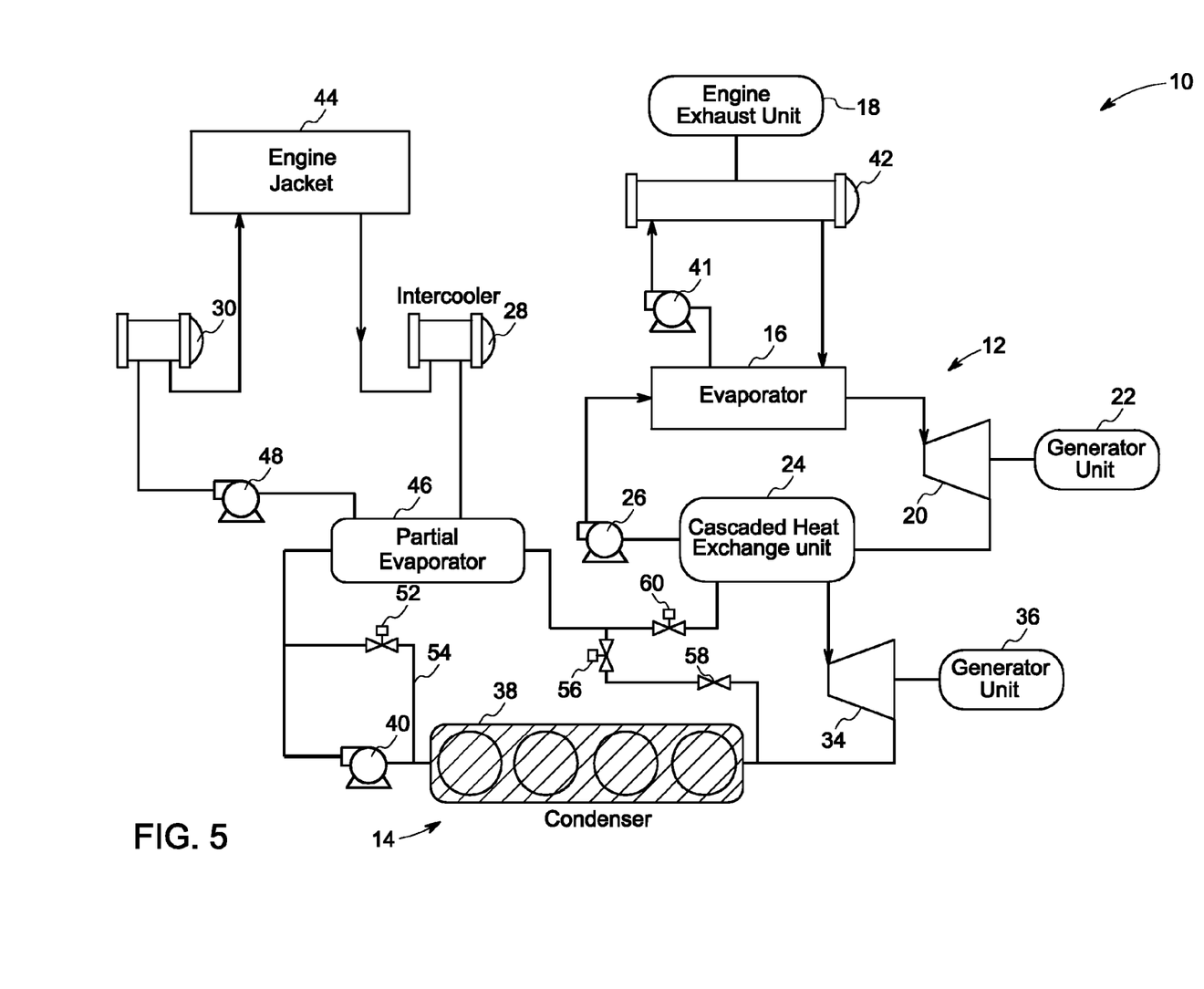
FIG. 5 is a diagrammatical representation of a waste heat recovery system having two integrated organic rankine cycle systems in accordance with yet another exemplary embodiment disclosed herein.

Referring to FIG. 5, a waste heat recovery system 10 is illustrated in accordance with an exemplary embodiment of the present invention. In the illustrated embodiment, the second organic working fluid circulated through second organic rankine cycle system 14 may include a mixture of working fluids and lubrication oil (that is, it may comprise a two-phase mixture). The partial evaporator 46 receives heat from a cooling water loop that collects heat from the intercooler 28, the oil heat exchanger 30, and the engine jacket 44 and generates a partially evaporated second organic working fluid two phase stream. The second organic working fluid stream is passed through the cascaded heat exchange unit 24 for complete evaporation or even superheating of the second organic working fluid. The vaporized second organic working fluid vapor is passed through the second expander 34 to drive the second generator unit 36.

After passing through the second expander 34, the second organic working fluid vapor at lower pressure and lower temperature is passed through the condenser 38. The second organic working fluid vapor is condensed into a liquid, which is then pumped via a pump 40 to the partial evaporator 46. In the illustrated embodiment, a first control valve 52 is provided in a path 54 for bypassing the pump 40 between the condenser 38 and the partial evaporator 46 and configured to control the flow of the second organic working fluid to the partial evaporator 46. As discussed above, the partial evaporator 46 is configured to preheat and partially evaporate the liquid being supplied to the cascaded heat exchange unit 24. In the illustrated embodiment, the fluid in the cooling water loop is pumped via the pump 48 to the oil heat exchanger 30, before being supplied to the engine jacket, 44, and the intercooler 28 before it enters the partial evaporator 46. The cycle may then be repeated.

In the illustrated embodiment, a second control valve 56 is coupled between the partial evaporator 46 and the condenser 38 and configured to control the flow of the second organic fluid from the partial evaporator 46 to the condenser 38 during system ramp up and shut down conditions. A pressure reduction valve 58 is also coupled between the partial evaporator 46 and the condenser 38 and configured to control the pressure of the flow of the second organic working fluid from the partial evaporator 46 to the condenser 38 during system/expander ramp up and shut down conditions. A third control valve 60 is coupled between the partial evaporator 46 and the cascaded heat exchange unit 24 and configured to control the flow of the second organic working fluid from the partial evaporator 46 to the cascaded heat exchange unit 24 during system ramp up and shut down conditions.

Figure 6:
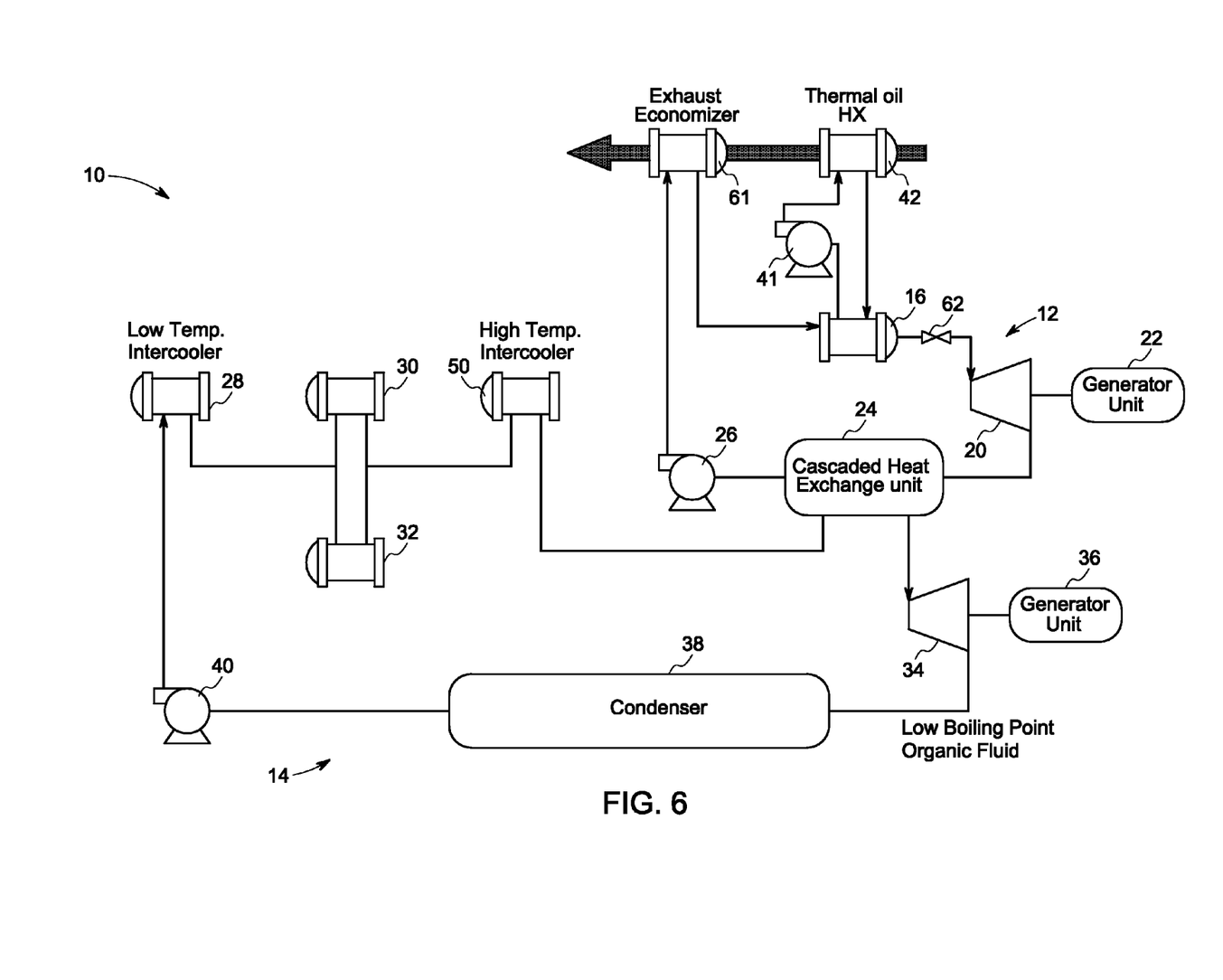
FIG. 6 is a diagrammatical representation of a waste heat recovery system having two integrated organic rankine cycle systems in accordance with yet another exemplary embodiment disclosed herein.

Referring to FIG. 6, a waste heat recovery system 10 is illustrated in accordance with an exemplary embodiment of the present invention. In the illustrated embodiment, the first organic rankine cycle system 12 includes the evaporator 16 coupled to the first heat source, i.e. the exhaust unit of the engine, via a thermal oil heat exchanger 42 and an exhaust economizer 61. The thermal oil is then pumped back from the evaporator 16 to the thermal oil heat exchanger 42 using a pump 41. A drying valve 62 is provided between the evaporator 16 and the first expander 20 and is configured to remove traces of moisture from the first organic fluid vapor exiting the evaporator 16. In the illustrated embodiment, the condensed liquid (i.e. first organic working fluid) from the cascaded heat exchange unit 24 is pumped via the pump 26 to the exhaust economizer 61. The condensed liquid is heated prior to being supplied to the evaporator 16.

In the illustrated embodiment, the cascaded heat exchange unit 24 is coupled to a plurality of second heat sources such as the lower temperature intercooler 28, the oil heat exchanger 30, the water jacket heat exchanger 32, and the higher temperature intercooler 50. The cascaded heat exchange unit 24 receives heat from the first organic working fluid and generates a second organic working fluid vapor. The heat sources disclosed herein may be coupled in series or parallel. The relative positions of the heat sources may also be varied depending upon the requirement. The second organic working fluid vapor is passed through the second expander 34 to drive the second generator unit 36. After passing through the second expander 34, the second organic working fluid vapor at lower pressure and lower temperature is passed through the condenser 38. The second organic working fluid vapor is condensed into a liquid, which is then pumped via a pump 40 to the lower temperature intercooler 28. In the illustrated embodiment, the second organic working fluid is passed through the lower temperature intercooler 28, the oil heat exchanger 30, the water jacket heat exchanger 32, and the higher temperature intercooler 50 before entering the cascaded heat exchange unit 24.

Figure 7:
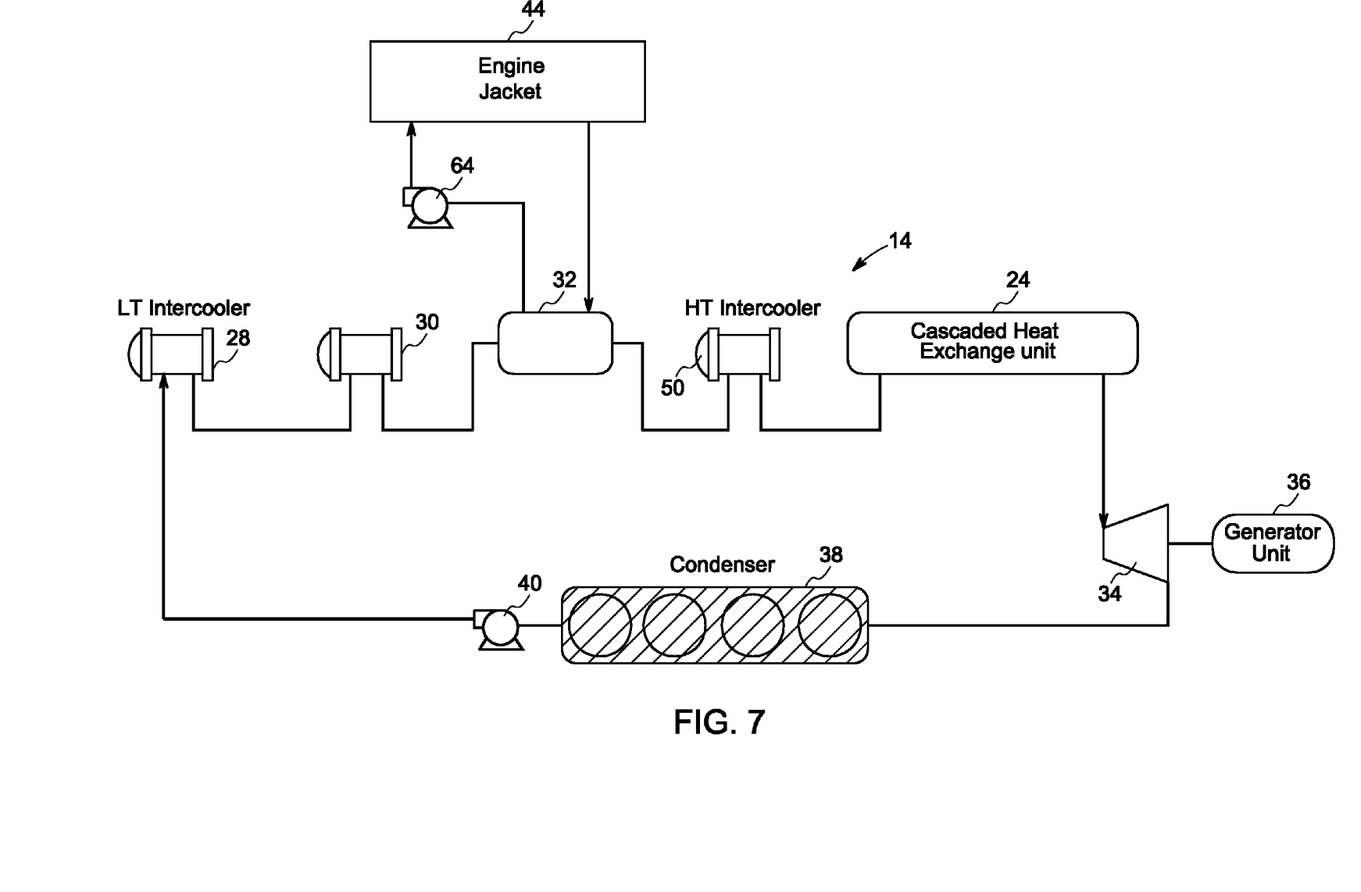
FIG. 7 is a diagrammatical representation of a bottom cycle of a waste heat recovery system in accordance with an exemplary embodiment disclosed herein.

Referring to FIG. 7, the second organic rankine cycle system 14 (bottom cycle) of the waste heat recovery system 10 is illustrated in accordance with an exemplary embodiment of the present invention. The cascaded heat exchange unit 24 is coupled to a plurality of second heat sources such as the lower temperature intercooler 28, the oil heat exchanger 30, the water jacket heat exchanger 32, the engine jacket 44, and the higher temperature intercooler 50. A pump 64 is provided to circulate cooling water between the jacket heat exchanger 32 and the engine jacket 44. As discussed in previous embodiments, the plurality of second heat sources is configured to preheat or partially vaporize (with "or" as used herein meaning either or both) the second organic working fluid. The second organic working fluid stream is passed through the cascaded heat exchange unit 24 for complete evaporation or even superheating of the second organic working fluid. The second organic working fluid vapor is passed through the second expander 34 to drive the second generator unit 36. After passing through the second expander 34, the second organic working fluid vapor at lower pressure and lower temperature is passed through the condenser 38. The second organic working fluid vapor is condensed into a liquid, which is then pumped via a pump 40 to the lower temperature intercooler 28. In the illustrated embodiment, the second organic working fluid is passed sequentially through the lower temperature intercooler 28, the oil heat exchanger 30, the water jacket heat exchanger 32 and the higher temperature intercooler 50 before entering the cascading heat exchange unit 24.

Figure 8:
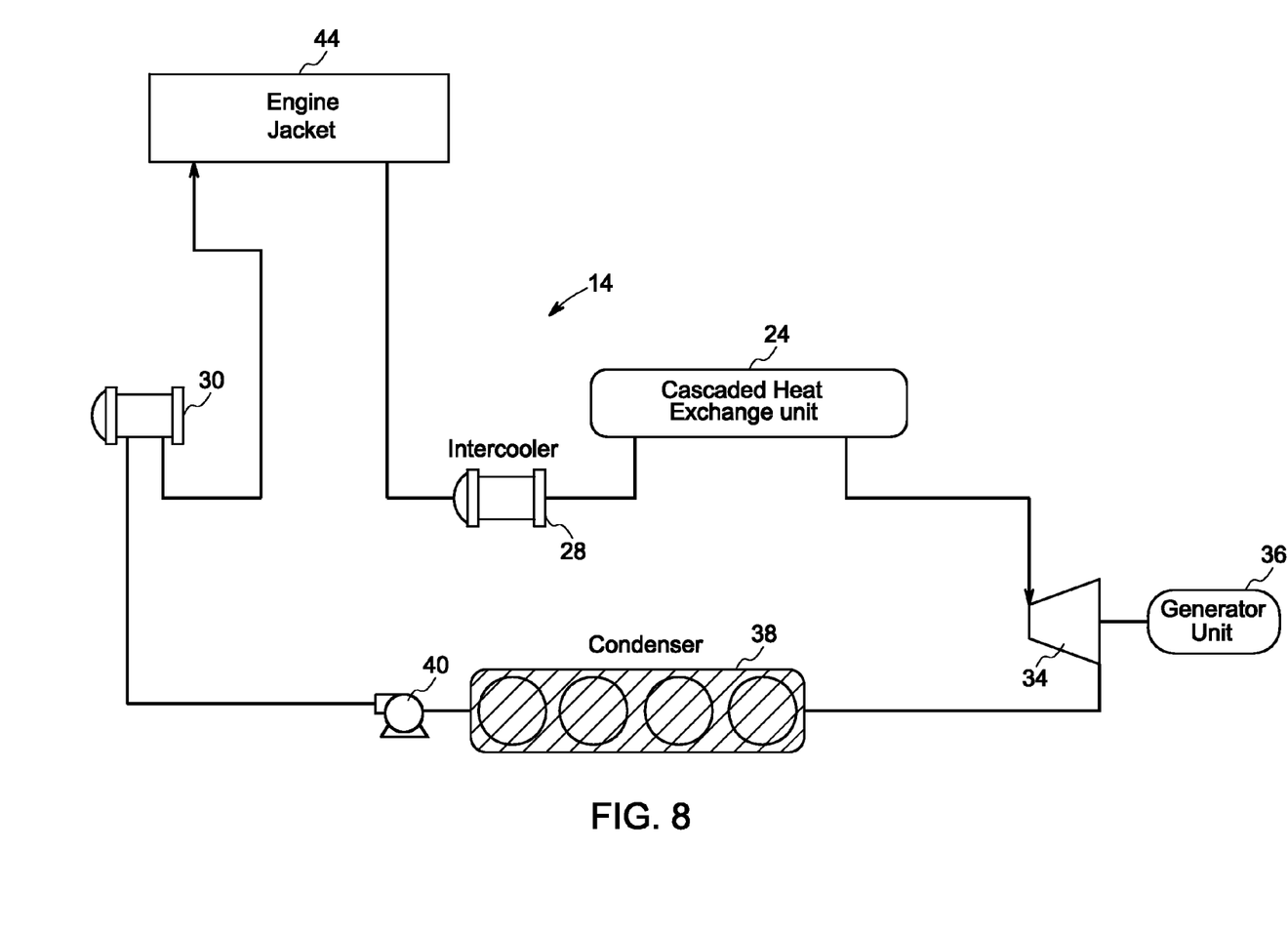
FIG. 8 is a diagrammatical representation of a bottom cycle of a waste heat recovery system in accordance with an exemplary embodiment disclosed herein.

Referring to FIG. 8, the second organic rankine cycle system 14 (bottom cycle) of the waste heat recovery system 10 is illustrated in accordance with an exemplary embodiment of the present invention. The cascaded heat exchange unit 24 is coupled to a plurality of second heat sources such as the oil heat exchanger 30, the engine jacket 44, and the intercooler 28. The cascaded heat exchange unit 24 receives heat from the first organic working fluid and generates a second organic working fluid vapor. The second organic working fluid vapor is passed through the second expander 34 to drive the second generator unit 36. In the illustrated embodiment, the intercooler 28, the oil heat exchanger 30, and the engine jacket 44 performs preheating or partial vaporization of the second organic working fluid flowing to the cascaded heat exchange unit 24. The cycle is continued as discussed in previous exemplary embodiments.

Figure 9:
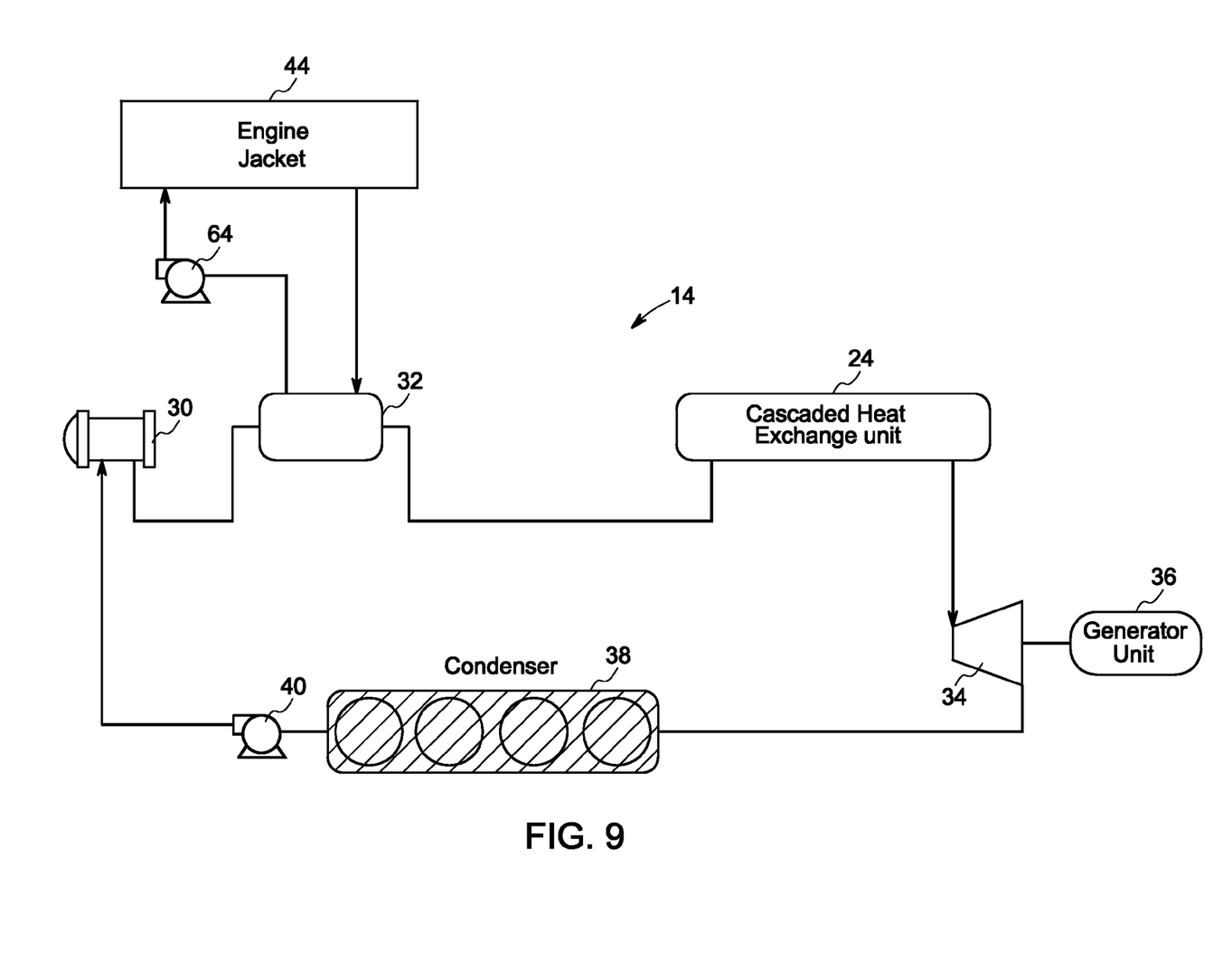
FIG. 9 is a diagrammatical representation of a bottom cycle of a waste heat recovery system in accordance with an exemplary embodiment disclosed herein.

Referring to FIG. 9, the second organic rankine cycle system 14 (bottom cycle) of the waste heat recovery system 10 is illustrated in accordance with an exemplary embodiment of the present invention. The cascaded heat exchange unit 24 is coupled to a plurality of second heat sources such as the oil heat exchanger 30, the water jacket heat exchanger 32, and the engine jacket 44. A pump 64 is provided to circulate cooling water between the jacket heat exchanger 32, and the engine jacket 44. The plurality of second heat sources is configured to preheat or partially vaporize the second organic working fluid. The second organic working fluid stream is passed through the cascaded heat exchange unit 24 for complete evaporation or superheating of the second organic working fluid. The second organic working fluid vapor is passed through the second expander 34 to drive the second generator unit 36. After passing through the second expander 34, the second organic working fluid vapor at lower pressure and lower temperature is passed through the condenser 38. The second organic working fluid vapor is condensed into a liquid, which is then pumped via the pump 40 to the oil heat exchanger 30.

It should be noted herein that with reference to FIGS. 1-9 that the number of second heat sources such as intercoolers, oil heat exchangers, jacket heat exchangers, evaporators and their relative positions are exemplary embodiments. The number of second heat sources and their relative positions in the second organic rankine cycle system may be varied depending the application. All such permutations and combinations are envisaged.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A waste heat recovery system including at least two integrated rankine cycle systems, the recovery system comprising:
    a heat generation system comprising at least two separate heat sources having different temperatures;
    a first rankine cycle system comprising a first expander, wherein the first rankine cycle system is coupled to a first heat source among the at least two separate heat sources and configured to circulate a first working fluid; wherein the first rankine system is configured to remove heat from the first heat source;
    a second rankine cycle system comprising a second expander and a condenser; wherein the second rankine cycle system is coupled to at least one second heat source among the at least two separate heat sources and configured to circulate a second working fluid, the at least one second heat source comprising a lower temperature heat source than the first heat source, wherein the second rankine cycle system is configured to remove heat from the at least one second heat source;
    a cascaded heat exchange unit, wherein the first and second working fluids are circulatable in heat exchange relationship through the cascaded heat exchange unit for condensation of the first working fluid in the first rankine cycle system and evaporation of the second working fluid in the second rankine cycle system;
    a partial evaporator configured to partially evaporate the second working fluid before entering the cascaded heat exchange unit;
    a pump situated between the condenser and the partial evaporator; and
    a first control valve situated in a by-pass path between the condenser and the partial evaporator,
    wherein the at least one second heat source is configured to partially evaporate the second working fluid before entering the cascaded heat exchange unit in a cycle of the second rankine cycle system.

2. The recovery system of claim 1, wherein the first rankine cycle system further comprises an evaporator coupled to the first heat source, and wherein the first heat source comprises an engine exhaust unit.

3. The recovery system of claim 2, wherein the evaporator is coupled to the engine exhaust unit via a thermal oil heat exchanger, an exhaust economizer, or combinations thereof.

4. The recovery system of claim 3, wherein the first working fluid from the cascaded heat exchange unit is fed through the exhaust economizer.

5. The recovery system of claim 1, wherein the first working fluid comprises steam.

6. The recovery system of claim 1, wherein the first working fluid comprises a first organic working fluid.

7. The recovery system of claim 6, wherein the first organic working fluid comprises cyclohexane, cyclopentane, thiophene, ketones, aromatics, or combinations thereof.

8. The recovery system of claim 1, wherein the second expander comprises a radial type expander, an axial type expander, or an impulse type expander.

9. The recovery system of claim 1, wherein the condenser is coupled to the at least one second heat source selected from a group comprising an oil heat exchanger, an engine jacket, a water jacket heat exchanger, a lower temperature intercooler, a higher temperature intercooler, or combinations thereof.

10. The recovery system of claim 9, wherein the lower temperature intercooler and the higher temperature intercooler are provided respectively to an upstream side and a downstream side of the cascaded heat exchange unit.

11. The recovery system of claim 9, wherein the condenser is coupled to the oil heat exchanger, the engine jacket, the water jacket heat exchanger, the engine jacket, the lower temperature intercooler, the higher temperature intercooler, or combinations thereof through the partial evaporator configured to partially evaporate the second working fluid before entering the cascaded heat exchange unit.

12. The recovery system 11, further comprising a second control valve coupled between the partial evaporator and the condenser, and configured to control the flow of the second working fluid to the condenser during system ramp up and shut down conditions.

13. The recovery system 11, further comprising a pressure reduction valve coupled between the partial evaporator and the condenser and configured to control the pressure of the second working fluid flowing from the partial evaporator to the condenser during system ramp up and shut down conditions.

14. The recovery system of claim 11, further comprising a third control valve coupled between the partial evaporator and the cascaded heat exchange unit and configured to control the flow of the second working fluid from the partial evaporator to the cascaded heat exchange unit.

15. The recovery system of claim 11, wherein the condenser is coupled to the oil heat exchanger, the partial evaporator, the water jacket heat exchanger, the engine jacket, the lower temperature intercooler, the higher temperature intercooler, or combinations thereof.

16. The recovery system of claim 1, wherein the condenser is coupled to at least two second heat sources selected from a group comprising an oil heat exchanger, an engine jacket, a water jacket heat exchanger, a lower temperature intercooler, a higher temperature intercooler, or combinations thereof.

17. The recovery system of claim 1, wherein the condenser is coupled to a group of heat sources selected from a group comprising an oil heat exchanger, an engine jacket, a water jacket heat exchanger, a lower temperature intercooler, a higher temperature intercooler, or combinations thereof.

18. The recovery system of claim 1, wherein the control valve is operable to control the flow of the second working fluid entering the partial evaporator.

19. The recovery system of claim 1, wherein the cascaded heat exchange unit is coupled to the second expander via a higher temperature intercooler configured to complete evaporation or to heat the second working fluid to a substantially higher temperature before entering the second expander.

20. The recovery system of claim 1, wherein the second working fluid comprises a second organic working fluid.

21. The recovery system of claim 20, wherein the second organic working fluid comprises propane, butane, pentafluoro-propane, pentafluoro-butane, pentafluoro-polyether, oil, or combinations thereof.

22. The recovery system of claim 1, wherein the first expander and the second expander are coupled to a generator unit.

23. The recovery system of claim 1, wherein the first expander and the second expander are coupled a first generator unit and a second generator unit respectively.

24. The recovery system of claim 1, wherein the second rankine cycle system is configured to remove heat from the first heat source.

25. The recovery system of claim 1, wherein the heat generation system comprises a combustion engine.

26. A waste heat recovery system including at least two integrated organic rankine cycle systems, the recovery system comprising:

a combustion engine comprising one heat source having an engine exhaust unit; and at least one other heat source selected from a group comprising an oil heat exchanger, an engine jacket, a water jacket heat exchanger, a lower temperature intercooler, a higher temperature intercooler, or combinations thereof;

a first organic rankine cycle system comprising a first expander, wherein the first organic rankine cycle system is coupled to the engine exhaust unit and configured to circulate a first organic working fluid; wherein the first organic rankine system is configured to remove heat from the engine exhaust unit;

a second organic rankine cycle system comprising a second expander and a condenser; wherein the second organic rankine cycle system is coupled to the at least one other heat source selected from the group comprising the oil heat exchanger, the engine jacket, the water jacket heat exchanger, the lower temperature intercooler, the higher temperature intercooler, or combinations thereof; and configured to circulate a second organic working fluid, the one heat source comprising a higher temperature heat source than the at least one other heat source, wherein the second organic rankine cycle system is configured to remove heat from the at least one other heat source;

a cascaded heat exchange unit, wherein the first and second organic working fluids are circulatable in heat exchange relationship through the cascaded heat exchange unit for condensation of the first organic working fluid in the first organic rankine cycle system and evaporation of the second organic working fluid in the second organic rankine cycle system;

a partial evaporator configured to partially evaporate the second working fluid before entering the cascaded heat exchange unit;

a pump situated between the condenser and the partial evaporator; and a first control valve situated in a by-pass path between the condenser and the partial evaporator, wherein the at least one other heat source is configured to partially evaporate the second organic working fluid before entering the cascaded heat exchange unit in a cycle of the second rankine cycle system.

27. The recovery system of claim 26, wherein the first organic rankine cycle system further comprises an evaporator coupled to the engine exhaust unit.

28. The recovery system of claim 27, wherein the evaporator is coupled to the engine exhaust unit via a thermal oil heat exchanger, an exhaust economizer, or combinations thereof.

29. The recovery system of claim 28, wherein the first organic working fluid from the cascaded heat exchange unit is fed through the exhaust economizer.

30. The recovery system of claim 26, wherein the condenser is coupled to the at least one other heat source selected from the group comprising the oil heat exchanger, the engine jacket, the water jacket heat exchanger, the lower temperature intercooler, the higher temperature intercooler, or combinations thereof.

31. The recovery system of claim 30, wherein the lower temperature intercooler and the higher temperature intercooler are provided respectively to an upstream side and a downstream side of the cascaded heat exchange unit.

32. The recovery system of claim 26, wherein the condenser is coupled to at least two other heat sources selected from the group comprising the oil heat exchanger, the engine jacket, the water jacket heat exchanger, the lower temperature intercooler, the higher temperature intercooler, or combinations thereof.

33. The recovery system of claim 26, wherein the condenser is coupled to a group of other heat sources selected from the group comprising the oil heat exchanger, the engine jacket, the water jacket heat exchanger, the lower temperature intercooler, the higher temperature intercooler, or combinations thereof.

34. The recovery system of claim 26, further comprising a partial evaporator; wherein the condenser is coupled to the oil heat exchanger, the engine jacket, the water jacket heat exchanger, the engine jacket, the lower temperature intercooler, the higher temperature intercooler, or combinations thereof through the partial evaporator.

* * * * *